Dec. 3, 1968  C. A. LAVERY ET AL  3,413,778
MEANS FOR SEPARATING LIQUID AND GAS OR GASEOUS FLUID
Filed Oct. 17, 1967  5 Sheets-Sheet 1

INVENTORS.
CHARLES A. LAVERY
CHARLES T. PATTERSON
WILLIAM R. WILLIS
BY
*Arthur L. Wade*
ATTORNEY Dec. 3, 1968   C. A. LAVERY ET AL   3,413,778
MEANS FOR SEPARATING LIQUID AND GAS OR GASEOUS FLUID
Filed Oct. 17, 1967   5 Sheets-Sheet 2

INVENTORS.
CHARLES A. LAVERY
CHARLES T. PATTERSON
WILLIAM R. WILLIS
BY
Arthur L Wade
ATTORNEY

INVENTORS.
CHARLES A. LAVERY
CHARLES T. PATTERSON
WILLIAM R. WILLIS
BY
ATTORNEY

Dec. 3, 1968　　　C. A. LAVERY ET AL　　　3,413,778
MEANS FOR SEPARATING LIQUID AND GAS OR GASEOUS FLUID
Filed Oct. 17, 1967　　　　　　　　　　　5 Sheets-Sheet 4
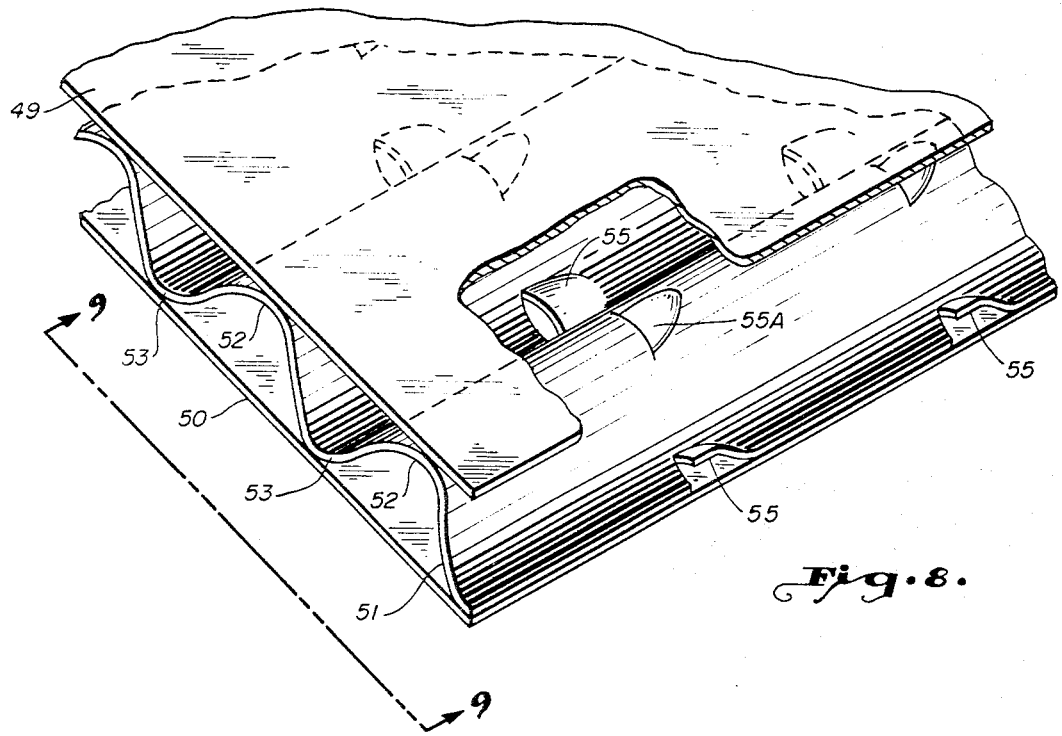
Fig. 8.
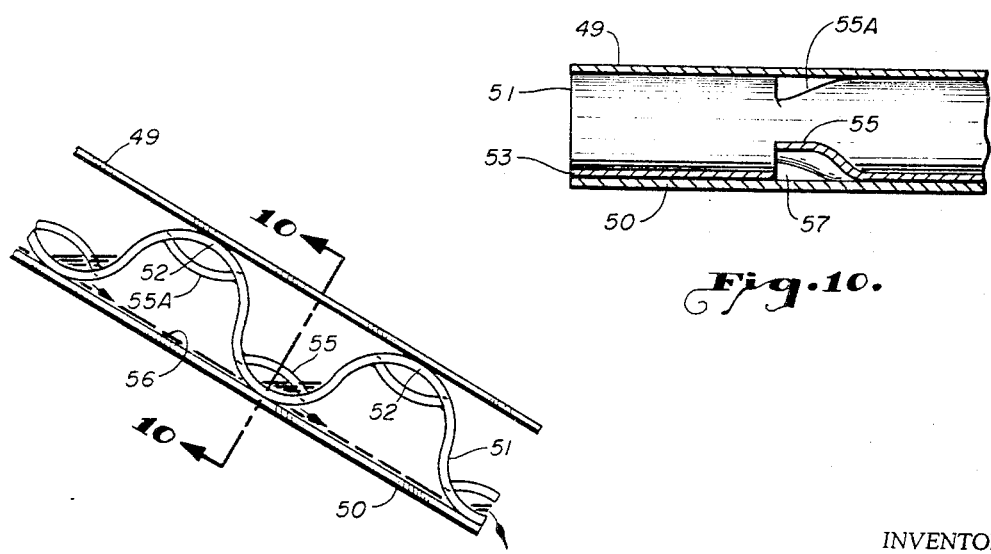
Fig. 10.
Fig. 9.
INVENTORS.
CHARLES A. LAVERY
CHARLES T. PATTERSON
WILLIAM R. WILLIS
BY
Arthur L. Wade
ATTORNEY

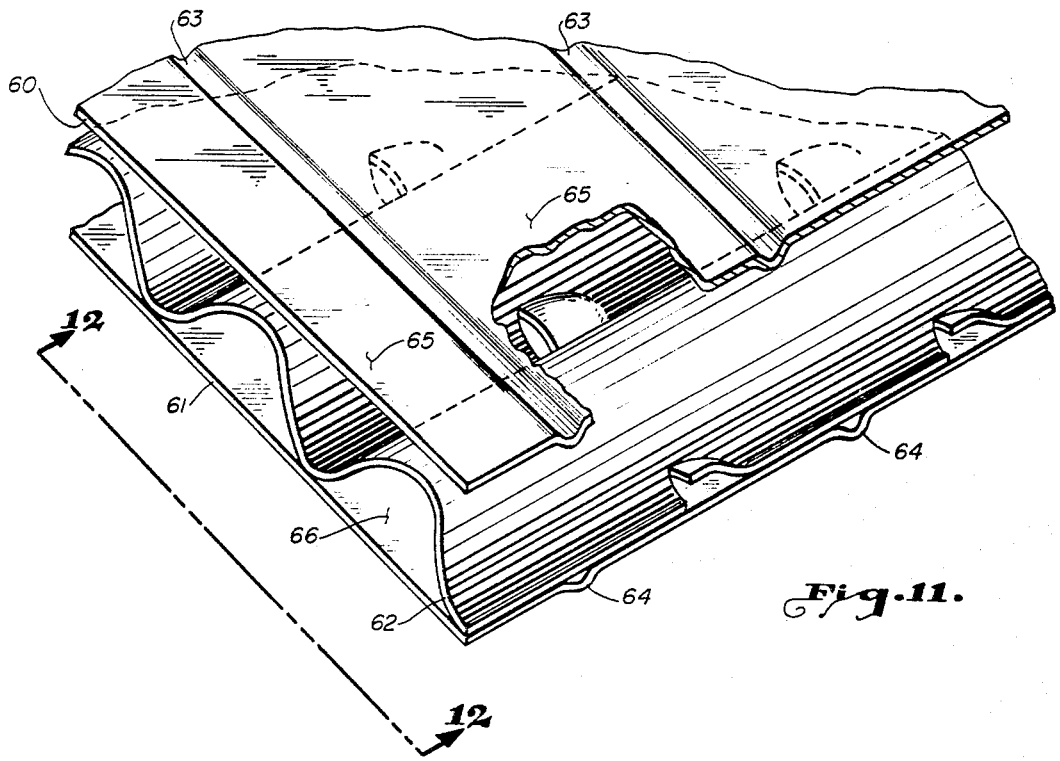
Fig. 11.
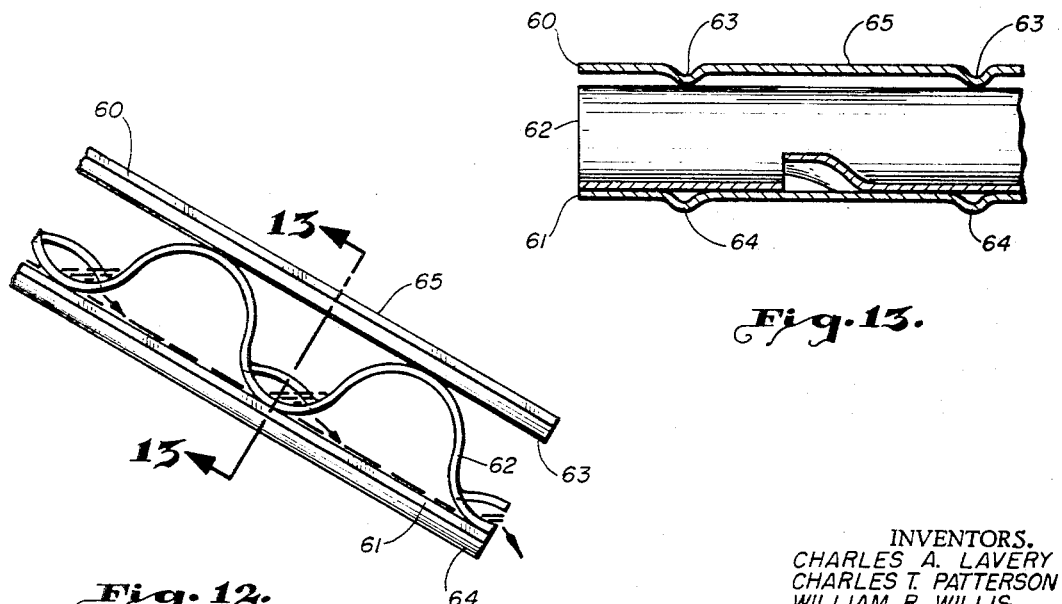
Fig. 12.
Fig. 13.
INVENTORS.
CHARLES A. LAVERY
CHARLES T. PATTERSON
WILLIAM R. WILLIS
ATTORNEY United States Patent Office 3,413,778
Patented Dec. 3, 1968

3,413,778
MEANS FOR SEPARATING LIQUID AND GAS
OR GASEOUS FLUID
Charles A. Lavery, Charles T. Patterson, and William R. Willis, Tulsa, Okla., assignors to Combustion Engineering, Inc., New York, N.Y., a corporation of Delaware
Continuation-in-part of application Ser. No. 515,034, Dec. 20, 1965. This application Oct. 17, 1967, Ser. No. 677,838
3 Claims. (Cl. 55—186)

ABSTRACT OF THE DISCLOSURE

Vessels through which liquids and gases are passed for separation are disclosed. The baffles within the vessels are arranged to provide passages in which the flow of fluids has its Reynolds number controlled without substantial effect upon the velocity of the fluids.

BACKGROUND OF THE INVENTION

This application is a continuation-in-part of our U.S. patent application S.N. 515,034 filed Dec. 20, 1965, and now abandoned.

This invention relates to separation of the components of multiphasic material. More specifically, the invention relates to separating the liquids and gas of oil well production as one of the initial steps in field-processing the production.

The teachings of United States Patent 2,349,944, issued to P. C. Dixon May 30, 1944, have successively guided the design of separators for many years. The advantages of the parallel plate baffles of the Dixon invention within separators, to provide collecting surfaces for the liquids of a gas-liquid-mixture, has been generally recognized. Whenever separators including "Dixon plates" have been put to comparative tests with other separators they have demonstrated they embody a sound theory of separation. The present problem is how to improve the basic, functional advantage of the Dixon plates and at the same time reduce the cost per pound of weight.

SUMMARY OF THE INVENTION

A principal object of the invention is to reduce the hydraulic radius in the gas flow path of a gas-liquid separator, in control of turbulence, without increasing the velocity of fluids passing through the separator as much as velocity through Dixon plates would increase when their hydraulic radius is reduced by moving them more closely together.

Another object is to provide more contact surface per cubic foot of volume in a separator than attainable with Dixon plates.

The present invention provides parallel flat plates with a transverse plate structure sandwiched between these flat plates. The plates are given a length compatible with forming machinery available and such units are employed in the numbers required for performance in a particular separator cross-section.

The transverse plate structure is preferably serpentine in coss-section, between its parallel flat plates. The crest of each convolution of the serpentine plate are provided with a series of interruptions along their lengths. The interruptions provide transverse drainage passageways for collected liquid flow along the surfaces of the flat plates. Further, to increase liquid collection and transfer from the upper surface of the convolutions to their lower flat plate, the interruptions may be formed in a scoop configuration facing upstream in the flow path. Collected liquid on the upper surface of the serpentine plate will flow to the valley between crests and be retained and directed to the lower flat plate by the scoop interruption.

Other objects, advantages and features of this invention will become more readily apparent to one skilled in the art upon consideration of the written specification, appended claims, and attached drawings, wherein, FIG. 1 is a sectioned side elevation of a horizontal gas-oil separator in which the present invention is embodied;

FIG. 2 is a sectioned side elevation of two connected horizontal gas-oil separators in which the invention is also embodied;

FIGS. 3 and 4 are cross-sections of the FIG. 1 separator along lines 3—3 and 4—4;

FIGS. 8–10 are views similar to FIGS. 5–7 taken of another form for the internal elements; and FIGS. 11–13 are views similar to FIGS. 5–10 taken of another form for the internal elements.

THE CHOICE OF EMBODIMENT FOR THE INVENTION

Figure 1:
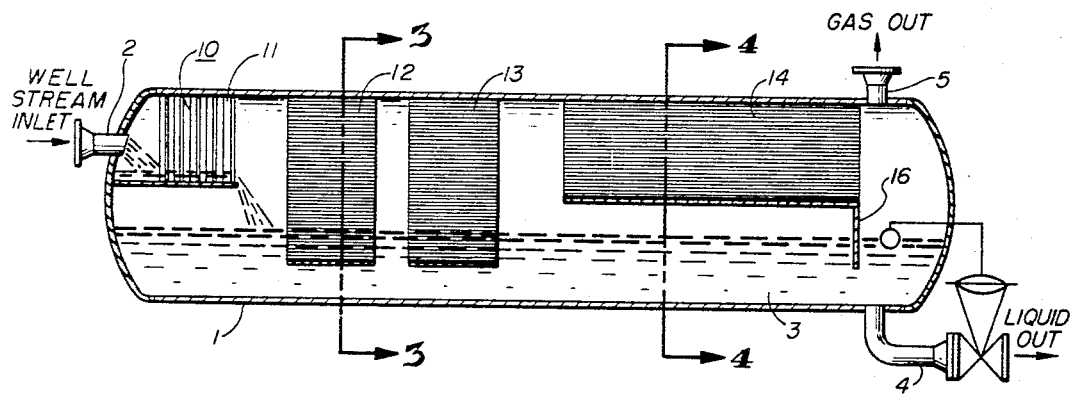

Oil-gas separation is only one small segment of the separating problem. This invention, in its application to other multiphasic materials, is certainly not to be limited to the oil-gas separation problem. However, the invention is disclosed as embodied in a structure and apparatus with which the gas and liquid of oil well production are physically separated to a desired degree.

A COMPREHENSIVE VIEW OF OIL-GAS SEPARATION

The broad requirements of an initial separation of oil well production are:

(1) Make a primary phase separation of the predominantly liquid hydrocarbons from those which are predominantly gaseous.

(2) Reduce any foam of liquid and gaseous hydrocarbons.

(3) Refine the primary separation by removing the entrained remnant mist of liquid hydrocarbon from the gas.

(4) Further refine the separation by providing for removal of entrained gas phase bubbles from the liquid phase so that the liquid contains no more physically entrained gas than would exist as potentially gaseous material at theoretical equilibrium conditions at the pressure and temperature within the vessel.

(5) Assure proper control by devices which will provide for the removal of the separated gas and separated liquid phases from the vessel without allowing an opportunity for re-entrainment of one into the other.

As indicated by point 5, a vessel is the locus within which the requirements are met. Within the vessel there is mounted structure for the stream of multiphasic material to contact in obtaining the results required. Structurally then, the design of the vessel and its internals must be considered. The design must:

(1) Control or dissipate the energy of fluids as they leave the flow line and enter the separating vessel.

(2) Ensure that the gas and liquid flow rates are always within the maximum permissible superficial velocity limits which will allow adequate separation.

(3) Minimize turbulence in the fluids as they pass through the separator.

(4) Control the accumulation and/or offset the effect of froths and foams in the vessel.

(5) Eliminate the re-entrainment of separated phases into each other.

Of the foregoing parameters of vessel design, the present invention is concerned primarily with 3 and 4. However, it is difficult, and unnecessary, to draw a sharp distinction between the effects of the invention on all the design parameters.

THE VESSEL OPERATION

Primary phase separation

The multiphasic stream brought to the vessel is a high-velocity, tubulent liquid phase mixed with gas. The first step is to control the momentum of these fluids; to reduce their flow rate to that value normal, in accord with the general $Q=AV$ relationship, within the vessel.

The inertia effects upon leaving the flow line connected to the vessel must be quickly and effectively overcome. Only then can natural gravity separation under normal velocities for the vessel size concerned occur.

A carefully designed and compact device is provided at the entrance to the vessel. Controlled directional deceleration of the incoming fluids is produced. A reduction in momentum results, concurrent with opportunity for subsequent natural gravitational separation, in spite of the high turbulence induced at the inlet point.

Downstream of the "momentum absorber" in an oil-gas separating vessel, therefore, a predominantly liquid material, with much entrained gas, has separated generally downward. Above this predominantly liquid material is a predominantly gaseous material, with much entrained liquid, moving either upward in a vertical separating vessel or longitudinally in a horizontal vessel.

The second phase

Following the primary phase of separation, the process is refined. Always, the design is sought that will control the separation in the smallest vessel size consistent with the volume of fluids to be handled.

Eventually the separator must provide a gas-free liquid and a liquid-free gas. These separated phases must approach in character the liquid and gas material which would exist in theoretical static equilibrium within a vessel at the given pressure and temperature conditions. This degree of separation is assumed in pressure-stage stabilization process calculations. Therefore, deviations due to gas entrainment in oil will materially alter the actual process results as compared to the calculated plan. Deviations due to liquid entrainment in the gas will just as obviously affect the actual compared to theoretical performance and lead to direct mechanical losses of oil from the recovery system.

BEHAVIOR OF LIQUID DROPS IN A GAS PHASE

The readiness of drops to disengage from a flowing gas stream depends upon:

(1) The relative density of the drops compared to that of the gas.

(2) The relative size of the drops.

(3) The magnitude of the vertical velocity component of the gaseous stream which opposes the downward separation of the drops.

(4) The relative turbulence in the vapor space of the vessel through which the separating drops must fall.

(5) The presence of any liquid and gas foam, which biphasic material does not behave as either a true vapor or a true liquid.

Any action to increase drop size, of course, increases the ultimate separation rate. On the other hand, generally speaking, as the diameter of a liquid drop of constant density material decreases, its falling velocity decreases. At some definite, though very small dimension, the particle comes within the range of Brownian movement and becomes a permanent fog. If it remained of that small diameter, it would never settle, no matter how slowly it traveled or for how far. This is why, in the ultimate, gas "dryness" must be defined in terms of the size of the liquid particles remaining entrained.

Another consideration of primary importance is the normal direction of gas stream travel. If the principal direction of travel from inlet to outlet is vertical, then the upward gas velocity component must be limited to that value which permits drops of given size to settle downward, counter-current, through the rising gas stream into the liquid collection areas.

However, if the normal flow is horizontal, then the falling path of a particle will describe a trajectory along the length of the vessel. Under these conditions, the velocity component must be limited only to that value which allows the particles, within the length limitation of the vessel, or its internal structure, to settle in or be collected on collection surfaces. Obviously, in all separation cases, the superficial gas velocity which results in comparable separation (i.e. the component which restricts or interferes with separation) will be allowably greater for horizontal flow than for vertical flow, size and flow throughput rate being the same.

The present invention provides sub-dividing passages, to reduce the Reynolds number, and collection surfaces for the drops under the same principles as embodied in the Dixon plates. At the same time the ratio of the weight per area of collection surface is reduced as well as the weight per unit of turbulence reduction. Further, the velocity of the fluid throughput is not substantially increased.

REDUCING TURBULENCE

Fundamentally, the internal structure of the separator must suppress excessively turbulent flow in the fluids passing through the separator. This requirement was originally appreciated in forming the Dixon plates.

The Dixon plates sub-divide the cross-sectional area of the vessel in which they are mounted. In so sub-dividing, the plates determine the Reynolds number of gases flowing between the plates. The closer the plates are spaced from each other, the lower the Reynolds number and the less turbulence for a given throughput of gases.

The generalization above is a reflection of the basic mathematical relations of the factors affecting the Reynolds number. It is well known that this dimensionless number is expressed by:

$$N_{\text{Re}} = \frac{DG}{\mu}$$

D represents the diameter of the cross-sectional area of a round conduit through which gases flow.

The difficulty in applying the formula is that many cross-sections are not round in shape but irregular. Therefore, the area and perimeter of odd shapes are considered. Considering any odd shape as having an equivalent round shape:

$$\frac{\text{Area}}{\text{Perimeter}} = \frac{\pi D^2/4}{\pi D} = D/4$$

The area of any shape, over its perimeter, is therefore a function of the diameter of an equivalent circle. The term Hydraulic Radius is given the ratio of area to perimeter, resulting in the diameter being equal to four times the Hydraulic Radius. As the diameter is D of the formula for Reynolds number, the Reynolds number varies directly as the hydraulic radius. This relationship would make it appear that the simple addition of subdivisions would be the answer to providing optimum individual flow passages with dimensions which yield a Reynolds number of reasonably low order of magnitude.

However, bringing Dixon plates to a spacing required to bring the Reynolds number to a reasonable value seriously limits the total cross-sectional area of large separator vessels available for passage of fluids. The slots between Dixon plates must be so narrow, to reduce their hydraulic radius, that the sheer mass of metal presented in cross-section to fluid flow seriously limits the throughput while increasing the velocity of the fluid throughput.

The thin slots can be broken up by transverse partitions within the slots. The hydraulic radius is thereby diminished. However, such transverse partitions must provide for drainage of liquids from the collecting surfaces down to the bottom of the vessel in which the structure is mounted.

The present invention therefore provides at least two features. First, the sub-dividing of the Dixon plates is introduced with structure which obviates the weight and velocity penalty of simply reducing the hydraulic radius by closer spacing of Dixon plates. Second, a drainage system is provided which is comparable to that of the Dixon plates.

FOAM IN GENERAL

Foam is a biphasic material which may be created within the gas liquid conglomerate whenever pressure or temperature conditions change. The volume of foam robs space from both gas and liquid sections to the extent that any given quantity of gas, when imposed on by a volume of foam, must pass through the separator at a higher velocity than would otherwise be the case. This increase in velocity reduces the effectiveness of separation of liquid drops. Also, a layer of foam over the liquid surface detracts from the ability of the liquid to give up entrained gas bubbles.

Fortunately, there is an inherent instability to foam deterioration patterns. Once the foam body starts to rupture, the rate of deterioration accelerates markedly. The answer to the problem is in providing sufficient contact surface for the foam. Enough surface will maintain the rate of accelerated break-up faster, or at least equal to, the rate of build-up. The present invention is embodied in a structure which provides the required surface while the Reynolds number is properly controlled. The structure embodying the present invention provides more surface per pound of weight than Dixon plates with comparable spacing to control the Reynolds number. Further, the invention provides adequate drainage of the liquids which results from the foam deterioration.

STRUCTURAL ARRANGEMENT OF SEPARATOR

Figure 2:
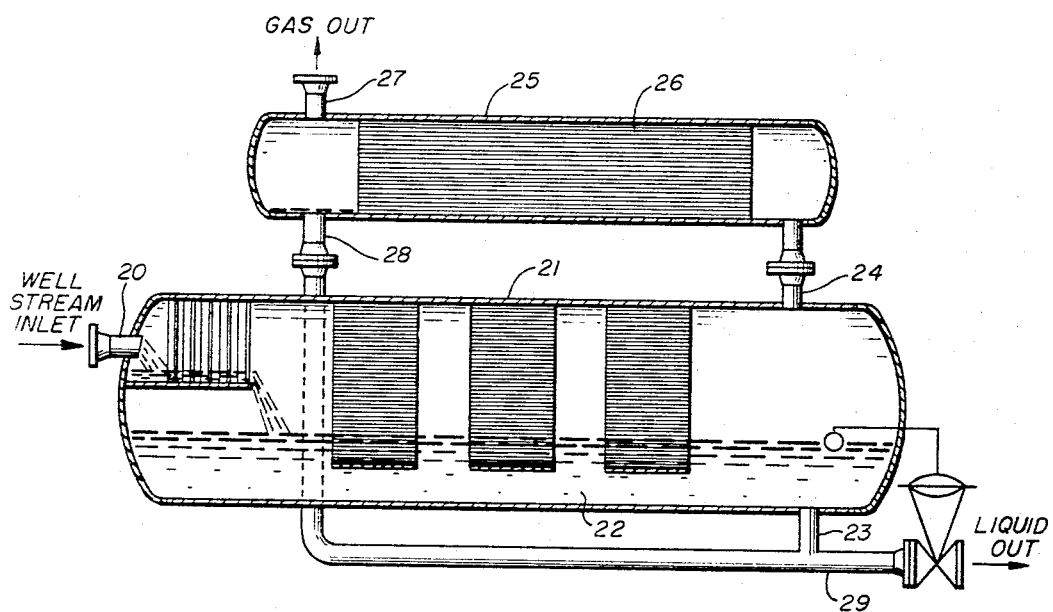

FIGS. 1 and 2 are sectioned side elevations of vessels in which the novel method is carried out with structure embodying the invention. FIG. 1 shows a two-phase oil and gas separator in which the oil and gas are separated and separately discharged. FIG. 2 shows one vessel similar to the vessel of FIG. 1 and a second vessel receiving the predominantly gaseous phase discharged from the first vessel for second stage, or additional, removal of oil from the gas.

In FIG. 1 the oil well production is introduced into vessel 1 through inlet conduit 2. The liquid phase of the production is collected as body 3 and discharged through outlet conduit 4. The gas phase is passed through the internal structure of vessel 1 and discharged through outlet conduit 5. It is the present invention which provides the required separation with internal structure in the vessel 1; the invention specifically providing a high degree of separation compared to the weight of the internal structure.

The initial structure within the vessel 1, which the production contacts, is a unit at 10. Essentially this unit is formed of baffles 11. Each baffle 11 has, substantially, a V-shape cross-section, and these baffles are disposed in rows extending transversely of the axis of the vessel. These baffles have their open sides facing toward the inlet and are staggered with relation to the baffles of the adjacent rows, whereby the fluids striking the baffles are caused to take a circuitous or tortuous path around and between the baffles.

Free liquid, of the biphasic stream, will be trapped by the baffles and caused to flow downwardly. The gaseous fluids will pass between the baffles.

Beyond the unit 10, downstream of the initial unit, the major portion of the vessel is occupied by separating units embodying the invention. These separating units are given two general arrangements. First, one or more of the novel units, 12, 13, are extended across the upper cross-section of the vessel and down to below the surface of the liquid body 3. Second, a unit 14 is extended across the upper cross-section of the vessel and down to a point above the surface of the liquid body 3. A partition 16 is extended from the downstream end of this unit 14 to well below the surface of the liquid body 3.

To emphasize how the units 12, 13 and 14 function independently of each other, FIG. 2 shows how a unit similar to unit 14 could be mounted in a vessel downstream of a vessel in which units similar to units 12, 13 are mounted. An inlet stream in conduit 20 is introduced into vessel 21. A liquid body 22 is carried in the lower part of vessel 21 and discharged through outlet conduit 23. The gas, and some entrained liquid, is discharged through conduit 24.

Outlet conduit 24 is also connected to vessel 25 as an inlet conduit. Within vessel 25, unit 26 occupies most of the volume through which the liquid-bearing gas passes to outlet conduit 27. Liquid extracted by unit 26 collects in the lower portion of vessel 25 and passes through conduit 28 to join the liquids of conduit 23 in conduit 29.

Control of the vessels in both FIG. 1 and FIG. 2 means the fluids flowing into the vessel, or out of the vessel, are regulated by valves in the inlet and outlet conduits. Although not shown, inlet conduits 2 and 20 could have valves mounted in them, regulating the flow of fluid from the upstream source of biphasic production. Also, the gas outlet conduits 5 and 27 could be regulated with similar valves.

Perhaps of more immediate and evident concern is the regulation of the liquids separated from the production stream. As these liquids collect in bodies 3 and 22 they are maintained at a desired level, keeping the lower ends of units 12 and 13 and partition 16 a desired distance below the surface of the bodies. A valve is shown in each of outlet conduits 4 and 29, each valve regulated from a float inside the vessels and responding to the level of the liquids.

GENERAL SEPARATOR OPERATION

The production flowing into vessels 1 and 21 is shown as comprised of gaseous hydrocarbons and liquid hydrocarbons. These two phases are to be separated, the gaseous phase discharged through one conduit and the liquid phase discharged through the other conduit.

The initial momentum of the fluids is absorbed as indicated in connection with unit 10. The free liquids are directed toward the lower portion of the vessel and into the lower liquid body. Foam may be generated in this first part of the vessel and become a problem. Separator units 12 and 13 offer a large surface with which this foam is contacted and ruptured at a rate at least equal to the rate of foam build-up or generation.

Downstream of the foam-breakers, the units 12 and 13, the lighter phase is scrubbed of its entrained liquids. Unit 14 is designed and positioned to do this scrubbing. The fluids are flowed in a generally longitudinal course within unit 14. At the same time, the fluids are didived into a series of parallel substantially unobstructed columnar paths in which laminar flow of the fluids is brought about.

Turbulence is suppressed within the body of fluids. The velocity of the flowing fluids and the hydraulic radius of the flow passages are balanced to produce the Reynolds number indicative of laminar flow of the fluids, or close to laminar flow. Deviation in the direction of fluid flow is kept to a minimum. Under these flow conditions, the liquid drops within the body of fluids follow a predetermined trajectory and reach a surface to which they adhere and on which they collect. Passages are provided by the invention for conducting these liquids into the body of liquids in the lower portion of the separator vessel. The gas, freed of the liquid, flows out of the vessel. The liquids, freed of the gas, flow out of the vessel.

The invention is embodied in at least the contact structure which collects and conducts the liquids, separating them from the gas and the gas from the liquids. This structure is efficient, providing the function of the Dixon plates but with a surprising reduction in weight for the performance obtained.

SEPARATOR UNITS GENERALLY

The units 12, 13 and 14 are arranged in their vessel 1 to first, break up or dissipate foam and, second, remove liquid drops suspended in the gas flowing to outlet 5. Units 12 and 13 are placed in the vessel just downstream of the entrance to the vessel in order to break up the foam. Unit 14 is placed just ahead of outlet 5, between the foam-breakers and the outlet.

Figure 3:
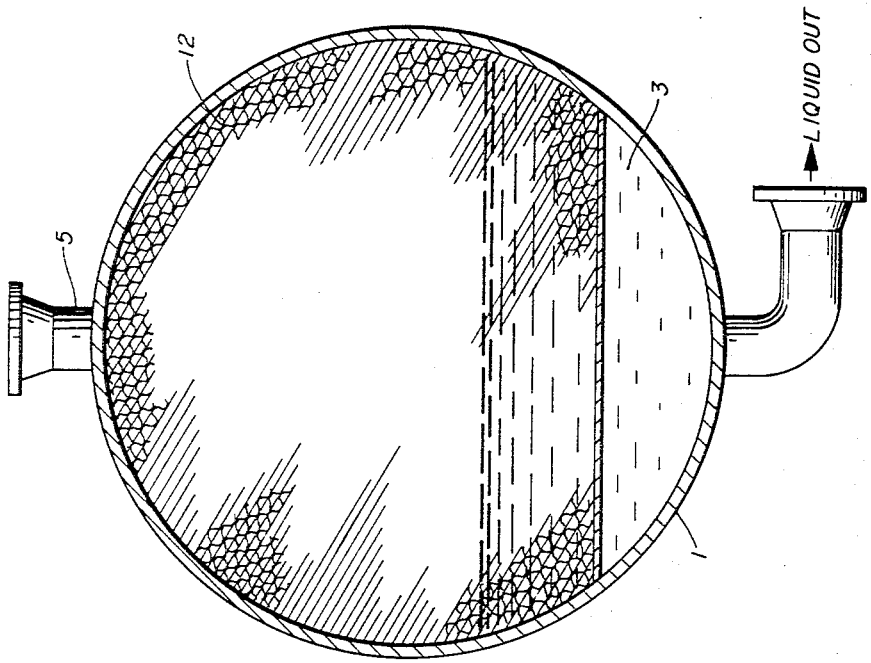

FIG. 3 shows the units 12 and 13 to occupy the complete cross-section of the vessel in the gas space and to extend a substantial distance below the surface of the liquid body 3. With the bottom of the units 12 and 13 liquid sealed, any foam is forced to pass into the extensive contact surface provided by these units.

As many of the units 12 and 13 are required can be mounted in series down the length of vessel 1. The length of each unit is fixed only by the technique of manufacture. In theory a single unit equivalent in performance to units 12 and 13 could be mounted in vessel 1 to dissipate foam.

Figure 4:
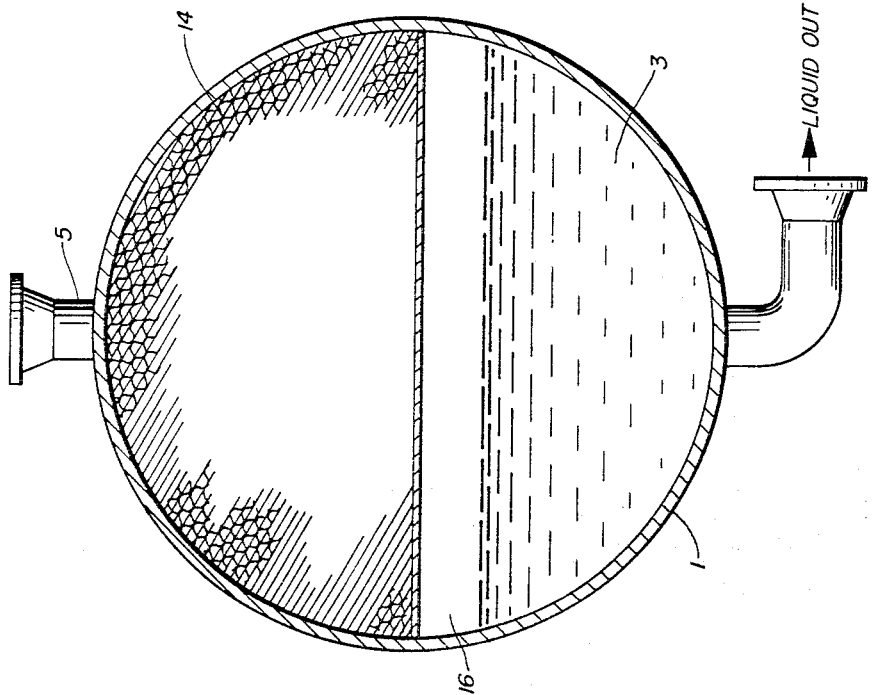

FIG. 4 shows a cross-section of vessel 1 through unit 14. The relation between the body of liquid 3, baffle 16 and the lower end of unit 14 is clear from this drawing disclosure. Baffle 16 provides a liquid seal with liquids 3 at the downstream end of unit 14, forcing all the gas, with liquid drops suspended therein, to pass through the passages of unit 14. The liquid removed from the gas will fall into the liquids 3 and the gas will pass out conduit 5.

SPECIFIC CONSTRUCTION OF SEPARATOR UNITS

FIGS. 3 and 4 make clear, to some extent, the common denominator of structure in all the units. All the units are made up of a series of flat, continuous plates, parallel to each other and extending longitudinally down the length of the vessel 1. Also, the plates are at a predetermined angle to a horizontal plane transverse the vessel.

Each pair of plates sandwich a plate which, in cross-section, appears serpentine in conformation. This sandwich structure is held as a unit by one of many possible forms of retaining structure not shown. The main features to be drawn from the FIG. 3 and FIG. 4 disclosures are the parallel flat plates forming, with the serpentine plate sandwiched between them, multiple columnar paths for the fluids to pass through between the inlet and outlet of vessel 1. Further, the sandwiching plates are at an angle to the horizontal to facilitate drainage removal of liquids extracted from the fluids passing through the structure.

Figure 5:
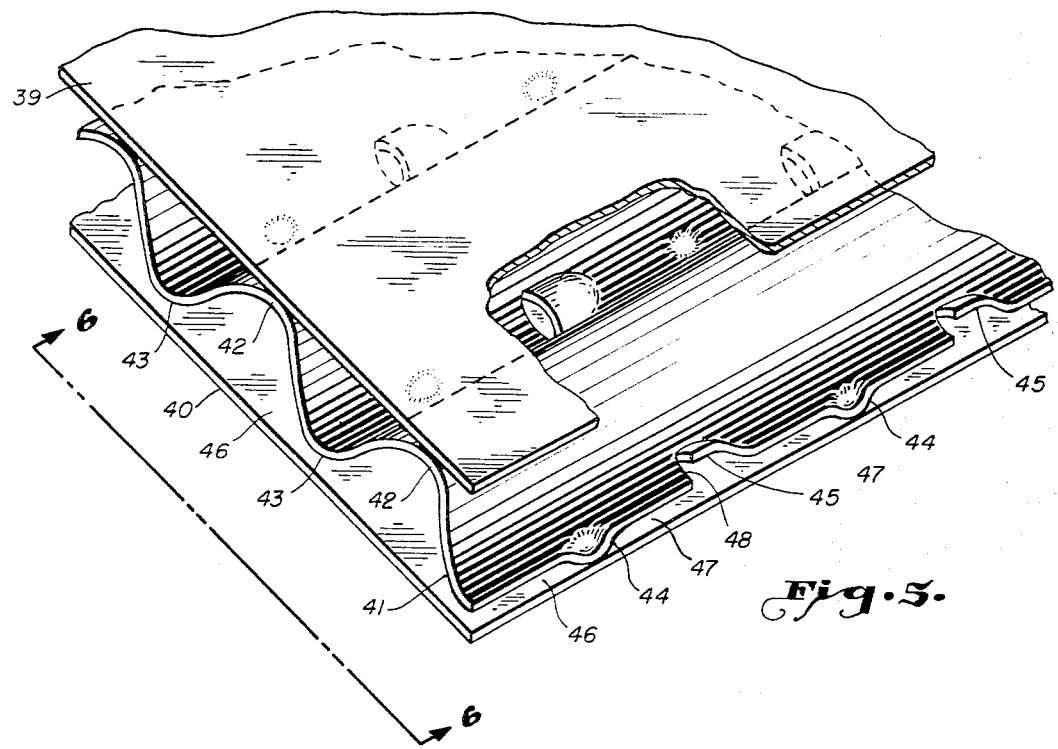
FIGS. 5–7 are various perspective views of a representative portion of the internal elements of the separators embodying the invention in the preferred form.
Figure 6:
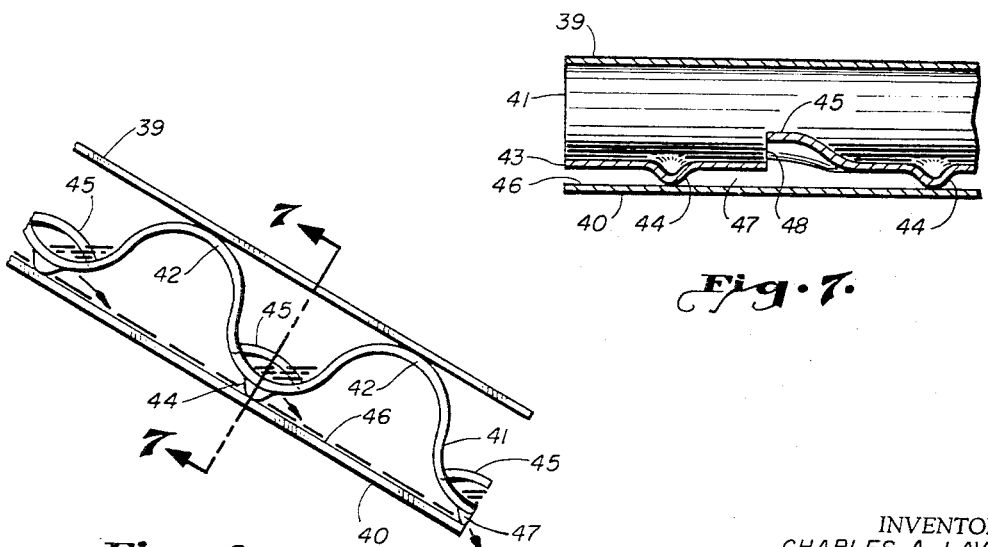

FIG. 5 was formed by taking two of the flat, continuous plates of the separator units and sandwiching the serpentine plate between them. FIG. 6 discloses how this combination of the three adjacent plates appear from an end view and FIG. 7 shows the combination viewed up the flat plates, at their angle with the horizontal.

Figure 7:
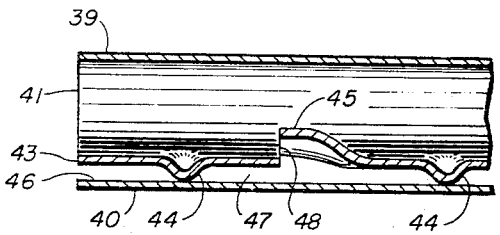

In FIGS. 5–7, specific reference is made to plates 39 and 40. These are flat plates which represent all the flat plates of the units sandwiching the serpentine plates. The sandwiched plate 41 is formed with a series of crests 42 between which a series of valleys 43 are arranged. The terms "crests" and "valleys" are selected because the serpentine configuration places the crests 42 above the valleys 43, even with the parallel sandwiching flat plates 39 and 40 at their predetermined angle to the horizontal.

Two different forms of interruptions are worked from the body of the plate 41 in the valleys 43. One of these interruptions is simply a "dimple" 44. The other is a "scoop" 45. These interruptions, in each valley, are shown as alternating and aligned along their valley 43. Dimple 44 is extended downward and engages the upper surface 46 of plate 40. Scoop 45 extends upward from the valley 43 and faces the flow of fluids along the columnar path formed in the valley between the crests.

Dimple 44 is simply a formation of the body of plate 42 which is extruded downward a finite distance below the valley portion of the plate 41. These dimples uniformly space the valleys of the plate 41 above the plate surface 46 to form passages 47 between dimples and along surface 46. The spacing of the dimples should provide adequate support of the serpentine plate upon lower plate surface 46. The dimples can be alternated with scoops 45 as shown, however, other arrangements of these elements can be made to provide the new results of the invention.

Scoops 45 are interruptions which are also formed of the material of plate 41 in valleys 43. However, these scoops 45 are projected upward from their valleys as shown clearly in all of FIGS. 5–7.

A cut is made through the body of the material at 48 on the forward end of the formation. The result is a scoop, or passageway, through the plate 41. Fluids passing down the columnar path are caught by this formation and directed through the cut to the passageway 47 with which it connects.

As with dimples 44, scoops 45 can be arranged along their valleys 43 as desired. They may be alternated with the dimples 44 as shown. They may be given other arrangements to carry out the objects of the invention.

The function of the structure of FIGS. 5, 6, and 7 is to control the turbulence of fluids flowing through the columnar paths provided, to collect liquids from the fluids and to flow the collected fluids down to the lower portion of the separator. The control of the turbulence follows the principles outlined previously. The contact surface provided for the liquids gravitated from the fluid mixture is formed of all the surfaces of plates 39, 40 and 41. The flow of this collected liquid on the upper surfaces of plates 40 and 41 is illustrated best in FIG. 6.

The liquids collected by the upper surfaces of plate 41 flow down into the valleys formed by the serpentine shape. At the bottom of the valleys these liquids are picked up by scoops 45 and discharged onto the surface 46 of the plate 40. Passageways 47 then conduct the liquids on surface 46 down toward the lower portion of the vessel to join body 3. Suitably placed and sized notches at the lower edges of plates 39 and 40 will complete the conduit system for collected liquids from the plates to the body 3.

FIGS. 8–10 disclose an alternate form of interruption for the sandwiched serpentine plate. Plates 49 and 50 are flat and similar in configuration and arrangement within their vessel to plates 39 and 40. Plate 51 is similar in general, serpentine, configuration to plate 41. Plates 49 and 50 sandwich plate 51 as plates 39 and 40 sandwich plate 41. However, the interruptions formed of plate 51 are different in arrangement and relation to the crests and valleys.

Plate 51 is arranged to provide crests and valleys as is plate 41. However, with respect to the vertical, it is contemplated to form the interruptions so the plate 51 can function as readily in the position shown as in its reverse position. In other words, crests 42 could function as valleys and valleys 43 could function as crests when provided the interruptions disclosed.

To provide the interchangeability of position without variation in function, interruptions 55 are formed from the floor of their valleys and interruptions 55A are formed below their crests 52 in identical shapes. Therefore, whether plate 51 is arranged on plate 50 to form valley 53 with interruption-scoop 55 extending upward as shown, or whether the plate is turned over to extend scoop 55A upward, the function of the combination is the same.

Without structure similar to dimples 55, plates 50 and 51 do not provide a passageway comparable to passageway 47. However, a passageway 57 is provided through the interruptions 55. This passageway may not have the capacity of passageway 47, but it does provide flow for the liquids along the upper surface 56 of plate 50 to the point where the liquids can gravitate to the lower portion of the separator vessel.

FIGS. 11–13 disclose still another form of structure in which a continuous plate of serpentine shape is sandwiched between a pair of parallel plates. Plates 60 and 61 are substantially flat; certainly they are continuous as they extend longitudinally within a vessel, at an angle to the horizontal and across a span of the interior of the vessel. The serpentine plate 62 basically functions, between plates 60 and 61, as the serpentine plates previously disclosed. The basic difference in this form is in the formation of the passages transverse the vessel length from plates 60 and 61 after the fashion disclosed in the Dixon patent.

Grooves 63 and 64 are formed in each of plates 60 and 61 to form passageways for liquids to flow from the upper surfaces 65 and 66 to the lower portion of the vessel in which the structure is mounted. These grooves 63 and 64 are quite similar to Dixon plate grooves and demonstrate the many variations of structure available to form a drainage system.

Interruptions are still required to transfer liquid from the upper surfaces of the serpentine plate 62 in this combination. At the same time, these interruptions, in the valleys of the plate, are a part of the transverse passageway system for liquid to flow from the upper surface of plate, to the underlying sandwiching plate and then to the bottom of the vessel. These grooves 63 and 64 offer some advantages in simplifying fabrication of the combination. Certainly they provide a practical embodiment of the invention.

GENERAL METHOD

Analyzing the method of handling well streams with the invention begins with the introduction of the well streams into one end of the elongated, horizontal vessel 1. From the entrance the fluids flow along the vessel internally in a longitudinal course. The internal units mounted within the vessel 1 then manipulate the fluids in accordance with the invention.

The Dixon plates divided such fluid bodies into paths whose cross-section was rectangular, extending as a cord across the circle of a horizontal vessel cross-section. The present method divides the fluid body into parallel columns. The divisions of the fluid body are maintained in these columnar paths until the more dense fluid phase has separated from the less dense fluid phase.

The more dense phase is then agglomerated on the surfaces of the unit with which the method is carried out. Finally, the agglomerated fluid phase is removed, or drained, from the columnar paths in a direction generally transverse the longitudinal course of the fluids in the paths.

If foam is present, the columnar paths provide a large surface per volume of dividing structure upon which the foam ruptures and deteriorates. Once the foam is ruptured and deteriorated, its liquid is removed in a direction transverse the columnar paths and collected below the paths for disposal.

GENERAL STRUCTURE

Heretofore, the structure embodying the invention has been disclosed as embodied in parallel flat plates with a transverse plate sandwiched by the flat plates; transverse plate preferably serpentine in cross-section. It is now emphasized that serpentine is a term regarded as covering any form of sandwiched plate which will join with the flat plates to form parallel substantially unobstructed columnar paths.

The term serpentine covers a plate with a cross-section of a series of contiguous rectangles or triangles. All such forms would create the desired columnar paths.

Also, the drainage system from the serpentine plate is formed by interruptions of the body of the plate in the broadest sense. The scoop configuration is not necessary. A straight, transverse cut through the valleys might suffice and eliminate the obstruction a scoop would provide. The basic function of the interruptions is to form passages from the valley side of the lower crests to the lower of the flat plates for the liquids of the biphasic fluids collected on the surface of the serpentine plate to flow onto the flat plate and along the flat plate into a collection in the lower portion of the vessel in which the unit is mounted.

The drainage system can be completed with various shapes of protuberances to cooperate with the interruptions. The interruptions can be formed in many shapes to extend the scope of the basic concept. The flat plate beneath the sandwiched plate can be grooved to provide additional passageway for drainage. However, the concept begins with the dividing plate and interruptions to provide for drainage from it.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. A separator for the components of biphasic fluid, including,
    an elongate horizontal vessel having an inlet at one end and an outlet at the other end,
    a plurality of substantially flat plates arranged parallel to each other and parallel the longitudinal axis of the vessel,
    a continuous plate between each pair of parallel flat plates conformed to a serpentine shape between pairs of flat plates and across the cross-section of the vessel, forming parallel substantially unobstructed columnar paths between the flat plates and in a direction parallel the longitudinal axis of the vessel, which paths are constructed and arranged to receive biphasic fluid from the inlet and flow the fluid along the length of the paths and below a predetermined Reynolds number,
    and passage means formed between the flat plates and the continuous plates sandwiched between the flat plates for transverse flow of the liquids of the biphasic fluid collected on the surface of the serpentine plate into the lower surface of one of the sandwiching plates and along the flat plate into a collection section in the lower portion of the vessel.

2. A separator for the components of biphasic fluid, including,
    an elongate horizontal vessel having an inlet at one end and an outlet at the other end,
    a plurality of smooth and continuous flat plates arranged parallel to each other and the vessel axis and extending longitudinally within the vessel,
    a continuous plate between each pair of parallel flat plates conformed to a serpentine shape between pairs of flat plates and across the cross-section of the vessel, forming parallel substantially unobstructed columnar paths between the flat plates and in a direction lengthwise the vessel, and interruptions formed from the body and at the lower crests of the serpentine plate to form passages extending transverse the columnar paths from the valley side of the crests to the lower of the flat plates for the liquids of the biphasic fluid collected on the surface of the serpentine plate to flow onto the flat plate and along the flat plate into a collection section in the lower portion of the vessel.

3. An internal element for a horizontal elongate section of an oil and gas separator vessel for contacting a mixture of oil and gas, including,
   a pair of smooth and continuous flat plates arranged parallel to each other and adapted to be extended horizontally within the horizontal elongate vessel section and at a predetermined angle to a horizontal line transverse the vessel section axis,
   a continuous plate sandwiched between the pair of flat plates and extended in a serpentine shape of crests and valleys between the pair to form columnar paths parallel the horizontal axis of the vessel section,
   interruptions formed along the valleys to extend upwardly as scoops to face the flow of material through the columnar paths formed by the serpentine plate between the pair of plates and form liquid conduits from the valleys to the flat plate below,
   and protuberances formed of the plate material in the valleys to engage the flat plate below in spacing the serpentine plate from the flat plate below to form liquid passages along the upper side of the plate below the serpentine plate and in a direction transverse the columnar paths to ultimately deliver the liquids in a collection section below the internal element.

References Cited

UNITED STATES PATENTS

| | | | |
|---|---|---|---|
| 2,019,186 | 10/1935 | Kaiser | 55—440 |
| 2,349,944 | 1/1941 | Dixon | 55—278 |

FOREIGN PATENTS

| | | |
|---|---|---|
| 20,244 | 9/1907 | Great Britain. |

REUBEN FRIEDMAN, *Primary Examiner.*

C. N. HART, *Assistant Examiner.*